United States Patent [19]

Ravishankar

[11] Patent Number: 5,755,870
[45] Date of Patent: May 26, 1998

[54] COMPOSITE AGGREGATE PIGMENTS FOR THE COATING INDUSTRY

[75] Inventor: Sathanjheri A. Ravishankar, Macon, Ga.

[73] Assignee: Dry Branch Kaolin Company, Dry Branch, Ga.

[21] Appl. No.: 763,903

[22] Filed: Dec. 11, 1996

[51] Int. Cl.⁶ ........................................... C09C 1/36
[52] U.S. Cl. ........................................ 106/438; 106/450
[58] Field of Search .............................. 106/438, 450

[56] References Cited

U.S. PATENT DOCUMENTS

| | | | |
|---|---|---|---|
| 4,017,324 | 4/1977 | Eggers | 106/288 B |
| 4,874,466 | 10/1989 | Savino | 162/164.3 |
| 4,943,324 | 7/1990 | Bundy et al. | 106/486 |
| 5,116,418 | 5/1992 | Kaliski . | |
| 5,152,835 | 10/1992 | Nemeh . | |
| 5,268,030 | 12/1993 | Floyd et al. | 106/450 |
| 5,279,663 | 1/1994 | Kaliski . | |
| 5,312,484 | 5/1994 | Kaliski . | |
| 5,344,487 | 9/1994 | Whalen-Shaw | 106/416 |
| 5,346,546 | 9/1994 | Kaliski . | |
| 5,371,051 | 12/1994 | Pope et al. | 501/145 |
| 5,378,399 | 1/1995 | Kaliski . | |
| 5,458,680 | 10/1995 | Shurling et al. . | |

OTHER PUBLICATIONS

Hackh's Chemical Dictionary, p. 725, 1969.

*Primary Examiner*—Deborah Jones
*Attorney, Agent, or Firm*—Needle & Rosenberg, P.C.

[57] ABSTRACT

This invention discloses a process of making composite aggregate pigments (CAPs) having superior optical and dispersion characteristics. These pigments are produced by aggregating titanium dioxide and calcined clay with zirconium hydroxy complex chemicals in a slurry in the pH range of 6.0–10.5. Superior optical properties are obtained by heat treating the pigments after removal from the slurry. Multi-faceted pigments are obtained by including a small amount of a rod-shaped pigment, such as wollastonite, in the composite pigment.

24 Claims, No Drawings

COMPOSITE AGGREGATE PIGMENTS FOR THE COATING INDUSTRY

BACKGROUND OF THE INVENTION

The demand, supply and capacity utilization of titanium dioxide has been forecasted by industry analysts to increase at a rate of 3-4 percent per year through the year 2005. Despite major plans by the titanium dioxide ($TiO_2$) producers to increase production the supply is expected to remain snug due to limitations in the operating capacity. As a consequence, price hikes could be sought by the producers to justify adding newer $TiO_2$ capacity and to compensate for the price increase in the raw material costs. The main response to the supply/demand conflict and the resulting price hikes of $TiO_2$ is the emergence of new technologies to produce less expensive high quality composite pigments for titanium dioxide replacement. The primary objective of developing composite pigments is to reduce the $TiO_2$ consumption cost effectively without sacrificing the desired optical and handling performance in a given end application.

Since the need for $TiO_2$ replacement has been a long term problem for the coating industry, the development of composite pigments has dated back to late 1930s. Earlier work indicates that many aspects governed by the classical theoretical principles, such as optical properties (light scattering, light absorption), particle size distribution, average particle size and dispersion characteristics of the constituting pigments must be considered. It is often desirable to aggregate a low refractive index carrier pigment such as clay and high refractive index premium light scattering pigment as $TiO_2$. However, the key to the success of developing a composite pigment is the process that structurally aggregates the carrier pigments and the premium pigment into one composite aggregate pigment. The role of the structural aggregation process is to effectively eliminate the inherent crowding effect (preferential agglomeration of $TiO_2$ pigments due to relatively large Hamaker constant ($6 \times 10^{-20}$J) that causes individual light $TiO_2$ scattering sources to combine and act like a single source and provide the synergistic advantage in the optical and handling properties over each of the constituting pigments.

A critical review of the prior art on the various processes of producing composite pigments suggests four broad categories. First is the homogenization of the surfaces of the constituting pigments with an inorganic dispersant and subsequently coagulating the homogenized particles with multivalent metal ions in solution. In this category the prior art dates back more than half a century when Alessandroni in U.S. Pat. No. 2,176,876 in 1938 prepared a composite pigment consisting of a high refractive index pigments such as $TiO_2$ with materials of low and medium refractive indices (1.5-2.0), such as lead carbonate and barium sulfate, by co-flocculating them using sodium silicate and aluminum chloride. Later, Wildt in U.S. Patent No. 3,726,700 illustrated the method of making composite pigments consisting of $TiO_2$ particles (3-50% by weight) and mineral extenders using an in situ formed continuous alumino-silicate gel as intrinsic cements. Kurrle in U.S. Pat. No. 4,117,191 used a metal silicate, specifically, the one produced from a mixture of sodium silicate and $CaCl_2$. The purpose of precipitating calcium silicate on clay or $TiO_2$ minerals is to space the pigment matter to enhance its optical properties.

Kaliski in his various U.S. Pat. Nos. 5,116,418, 5,279, 663; 5,312,484; 5,346,548; 5,378,399 described an in situ gel-setting cement involving two steps: 1) an in situ formation of "functional hydrosol" by reacting sodium silicate and sodium aluminate and 2) the conversion of a "functional hydrosol" to a "microgel" by reacting the hydrosol with calcium ions. Kaliski suggested that this in situ formed "microgel"—complex calcium aluminosilicate—is capable of flocculating the particulate matters instantaneously and indiscriminately.

In the second category, pigment particulates were aggregated by in situ hydrolysis of bi-, tri-, or tetra-valent metallic salts in the presence of slight moisture. Jones in WO 87/00544 used silicon tetrachloride. Later, Raythatha in U.S. Pat. No. 4,826,536 disclosed a process of aggregating fine particulate kaolin with a metal chloride having the general formula $MCl_x$, where M is a Si, Al, or Ti atom; and x is 3 or 4 depending on the valence of M, for e.g. silicon tetrachloride, under a controlled moisture environment. Raythatha in U.S. Pat. No. 4,326,536 suggested that a high level of moisture, in excess of 5%, in the feed causes inefficient aggregation. Raythatha in U.S. Pat. No. 4,818,294 disclosed a dry process for the aggregation of kaolin using organo-silicon compounds having a general formula Si $(OR)_4$ where R is an alkyl group containing up to six carbon atoms. Recently, Shurling et al. in U.S. Pat. 5,458,680 used a similar method to produce composite pigments of ground calcium carbonate and kaolin.

In the third category, the well known polymer bridging flocculation concept was used to aggregate the different pigment particulates to form a composite pigment. Nemeh in U.S. Pat. No. 5,152,835 produced composite pigments in the slurry form using a cationic organic polymer (dimethyl diallyl quaternary ammonium chloride, commercially available under the trademark designation Polymer261 LV from Calgon Corporation) by heteroflocculating $TiO_2$ and calcined clay pigments. The same concept of polymer flocculation was applied by Curtis et al. in U.S. Pat. No. 5,336,311 and Savino in U.S. Pat. No. 4,874,466 to produce composite cationic pigments and cationic $TiO_2$, respectively. Curtis et al. in U.S. Pat. No. 5,336,311 flocculated a slurry containing an anionic composite pigment of titanium dioxide and calcined clay (which has been composited previously by gelling chemicals such as aluminates, silicates and calcium salts) using epichlorohydrin and melamine condensate polymers.

In the fourth category, in situ polymerization or condensation of one or more organic compounds mixed with pigment particulates was used. Fadner in U.S. Pat. No. 3,453,131 used aliphatic dicarboxylic acid such as adipic acid to couple functional colloids such as carbon black to non swelling carrier clay particles. The effectiveness of complexation was monitored by the turbidity of the supernatant. Simone in U.S. Pat. No. 3,912,532 describes a method to encapsulate clay particles using an urea-formaldehyde condensation polymer. Economou in U.S. Pat. No. 4,346,178 used the same basic process, but with much less urea-formaldehyde, to produce a pigment with improved light scattering properties and an "open structure" with microvoids of desirable size in the product.

Bundy et al. in U.S. Pat. Nos 4,075,941 and 4,076,548 used diamine and polyamines in combination with citric acid to flocculate clay with 94% of its particles having a particle size below 2 mm with a small quantity of mica (0.1-0.4%) as the feed material to produce high bulking clay pigments. Further, Bundy et al. described in U.S. Pat. No. 4,078,030 that the calcination of the product obtained in the U.S. Pat. Nos. 4,075,941 and 4,076,548 enabled additional bulking of the pigments.

The discussed prior art of the composite pigments in all the four categories mainly focused on achieving superior optical properties. However, the prior art seldom has considered the combination of superior optics, easy handling and pumping characteristics in slurry form, acceptable high shear viscosity at practical pigment solids levels and resistance to settling under static conditions, which are necessary for successful commercialization. In fact, the capability to ship a slurry of composite pigments at higher solids for immediate use than can presently be done is an important criterion to the commercialization of the product. Typically, a composite pigment, in addition to superior optical properties, should be capable of being formed as a high solids slurry with at least 55% pigments solids, and preferably at least 57% pigment solids and ideally at least 59% pigment solids, but having satisfactory handling characteristics. Unfortunately, existing processes for making composite pigments were not able to deliver the high solids/slurries with superior optical and desired handling aspects which is a major drawback to commercialization.

SUMMARY OF THE INVENTION

It is the main objective of this invention to develop a process for producing composite aggregate pigments (CAPs) having superior optical characteristics for conventional and special coating applications in the paper, paint, plastic and rubber industries.

It is also an objective of this invention to develop a process for producing CAPs having commercially exploitable factors such as acceptable handling properties, high shipable solids in a slurry form and superior optical properties.

It is an objective of this invention to develop a composite aggregate pigment (CAP) comprising two or more differently shaped pigmentary materials such as titanium dioxide, calcined clay and wollastonite chemically aggregated with zirconium hydroxy complex chemicals.

It is a further objective of this invention to utilize differently shaped pigments in an effort to obtain a synergistic advantage in optical properties combined with handling aspects over the currently commercially available composite pigments.

These objectives have been achieved in this invention art by developing a new composite aggregate pigment comprising of titanium dioxide and calcined clay (which may optionally be partially or fully replaced by an extender pigment, such as wollastonite) which is aggregated by a new process using zirconium hydroxy complex chemicals to obtain composite aggregate pigments with superior optical and handling properties.

DESCRIPTION OF THE INVENTION

This invention relates to a new and novel method of aggregating:

(1) 2 to 90 parts, by weight, of at least one type of titanium dioxide namely, rutile or anatase, or a mixture of rutile and anatase in any proportion and combination produced thereof or of at least one form of TiO$_2$ and other pigment materials of a refractive index above 2.0, such as zirconium oxide, in 20:1 to 1:20 ratio with TiO$_2$; with (2) 10 to 98 parts, by weight, of at least one extender pigment such as calcined clay which can be optionally replaced by the following extender pigments:

a) from 0.1% to 99.5%, by weight of the extender pigment, of a low refractive index pigmentary material, e.g. wollastonite, aluminum trihydrate (ATH)

b) from 0.1% to 99.5%, by weight of extender pigment, of a mineral pigment, e.g. hydrous kaolin;

c) from 0.1% to 50%, by weight of extender pigment, of silica where silica is preferably obtained by ashing rice husk or hull at 300°–800° C.;

d) from 0.01% to 50%, by weight of extender pigment, of carbon;

e) from 0.1% to 49.5%, by weight of extender pigment, of at least one form of calcium carbonate;

f) from 0.1% to 90%, by weight of extender pigment, of synthetic aluminosilicate spheres with a hollow core of 1–125 μm outer diameter and 0.01 to 100 μm core diameter, in any proportion and combination;

(3) with 0.01 to 20 parts, by weight, of a zirconium hydroxy complex chemical of either of the following structures:

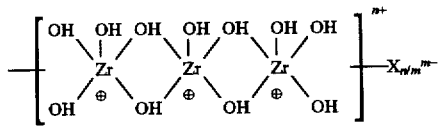

where "X" is a ligand from the group consisting of oxychloride, oxynitrate, hydroxychloride, acetate, nitrate, propionate, carbonate, orthosulfate, phosphate, glycolate, mandelate, sulfate, and aluminate, "n" is the number of charge on the zirconium hydroxy complex which varies from 2 to 10, and "m" is the charge of the ligand and;

(B)

where "X" is a carbonate, hexafluoride, glycolate, lactate, sulfate, and aluminate, and "A" is an ammonium, sodium or potassium ion, "k" is 1 to 3, "l" is 2 to 5, "m" is 2 to 10, "n" is 1 to 4.

The above mentioned classes of zirconium hydroxy complex chemicals can be used as such or in a mixture with two or more zirconium hydroxy complex chemicals in any proportion and combination thereof for the aggregation process. Additionally, from 0.1 to 90% of the zirconium hydroxy complex chemicals can be replaced by multivalent metal ions selected from groups IIa, IIb, IIIa, VIa, and VIb, or preferably with polyaluminum chloride (PAC) in 10:1 to 1:10 molar ratio where PAC has a degree of neutralization or the basicity as defined by following relationship:

$$\% \text{ Basicity} = \frac{|OH|}{3*[Al]} * 100,$$

between 10% to 90%.

The term "polyaluminum chloride" (PAC) includes aluminum chlorohydrate, polyaluminum chloride, and mixtures of polyaluminum chloride and aluminum chlorohydrate.

The chemical aggregation can be conducted in aqueous or air media and the aggregated composite pigment can be recovered in dry form by: 1) conventional filtration techniques followed by oven drying at 60° to 150° C., 2) flash or spray drying techniques, 3) direct oven drying at 60° to 150° C. and 4) heat treating the composite pigment particles at 150°–1100° C. When this chemical aggregation is conducted in an air media, it is essentially a dry process. Heat treatment of these composite aggregate pigments significantly increases the scattering power of the pigments. A combination of drying processes can be used. The preferred combination of drying is to use processes 1, 2 and 4. Before heat treating the aggregated product, it is preferred that the composite aggregate pigment slurry or dry powder be pretreated with 0.05–5%, by weight, of antimony trioxide or potassium antimony tartarate. The addition of antimony salts to the slurry or dry powder of composite aggregate pigments as a precursor to the heat treatment step facilitates the removal the gray coloration or stain developed on the composite aggregate pigment particles during the heat treatment above 300° C. The entire process of production of composite aggregate pigment can be a batch or continuous process.

The method of preparing composite aggregate pigments and the product produced are useful in a variety of coating applications in paper, paint, plastic and rubber where the coating layer is required to have superior hiding and light scattering properties.

The composite pigment preparation in the present invention comprises:

(1) 2 parts to 90 parts, by weight, preferably 10 parts to 75 parts by weight, and ideally 30 parts to 55 parts by weight of at least one type of particulate titanium dioxide namely, rutile or anatase, combined with (2) 10 parts to 98 parts, by weight, preferably 25 parts to 90 parts by weight, and ideally 45 parts to 70 parts by weight of at least one extender pigment such as calcined clay, chemically aggregated with (3) the aid of 0.01 to 20 parts, by weight, of a zirconium hydroxy complex chemical of either of the following structures:

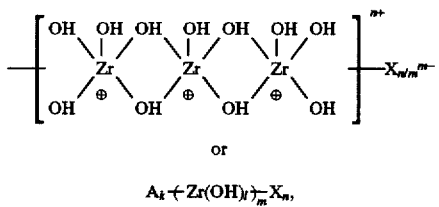

or $A_k + Zr(OH)_l \frac{1}{m} X_n$,

The preferred particulate $TiO_2$ (rutile or anatase) materials used in preparing the composite aggregate pigment can be of the following types or blends thereof in any proportion and combination: $TiO_2$ pigments sold commercially as rutile and anatase products, having essentially 100%, by weight, of a particle size finer than 5 μm; 88–99% finer than 2 μm; 85–97% finer than 1.0 μm; 75–90% finer than 0.5 μm; 35–75% finer than 0.3 μm; 10–30% finer than 0.2 μm in equivalent spherical diameter (e.s.d), the average s.d being about 0.18–0.35 μm.

The preferred pigmentary extenders for synthesizing the composite aggregate pigment products of the present invention comprise calcined clays of particle size approximately 100%, by weight, finer than 5 μm e.s.d., preferably 90%, by weight, finer than 2 μm e.s.d., the median e.s.d. being about 0.25–0.8 μm and optionally comprising one of the following materials:

a) from 0.1 parts to 99.5 parts, by weight, of a low refractive index pigmentary material, e.g. wollastonite; aluminum trihydrate.

b) from 0.1 parts to 99.5 parts, by weight, of a mineral pigmentary mineral for carrier purpose, e.g. hydrous kaolin;

An aqueous slurry is obtained by mixing at least one form of particulate titanium dioxide and at least one of the pigment extenders (e.g. calcined clay) to achieve solids ranging from 10 to 99.9%, by weight, preferably in the 20–80% range, by weight, and ideally, 55–75% by weight. The pH of the slurry ranges between 4 to 12. The pH modifiers used in this invention are standard inorganic acids such as HCl or $H_2SO_4$ and alkali such as NaOH or $Ca(OH)_2$. It is, however, preferred to maintain pH range from 6–11, and ideally 8.5–10.5. In cases where the medium of aggregation is air, the pH does not apply.

In the preferred process of aggregation for synthesizing the composite aggregate pigment products of the present invention, the zirconium hydroxy complex chemicals of the 0.01 to 20 parts by weight, as determined by the microwave drying process (@20% power of a CEM microwave oven; model AVC-80) include:

3(A) zirconium oxychloride, zirconium oxynitrate, zirconium hydroxychloride, zirconium phosphate, zirconium acetate and zirconium propionate; and 3(B) potassium zirconium carbonate, ammonium zirconium carbonate, ammonium zirconium sulfate, zirconium orthosulphate, potassium zirconium hexafluoride and zirconium aluminate.

The zirconium hydroxy complex chemicals, can be used as such, or preferably in combination with multivalent metal ions selected from group IIa, IIb, IIIa, IIIb, IVa, and IVb, (e.g. $Mg^{2+}$, $Ca^{2+}$, $Zn^{2+}$, $Al^{3+}$, $La^{3+}$, $Si^{4+}$, $Ti^{4+}$, Zr ions, etc.) or ideally with PAC in 10:1 to 1:10 molar ratio where PAC is with a degree of neutralization or basicity as defined by following relationship:

$$\% \text{ Basicity} = \frac{[OH]}{3 * [Al]} * 100, \quad [3]$$

between 10% to 90%.

The addition of zirconium hydroxy complex chemicals increases the viscosity of the colloidal suspension as a result of aggregation. As a consequence, the Brookfield viscosity frequently exceeds 1000 cps at 20 rpm. To reduce the viscosity and to convert the thick suspension to a manageable fluidity with a Brookfield viscosity in the range 400–600 cps at 20 rpm, additional dispersants, preferably anionic polyelectrolytes, are added. The pH of the product in the slurry form can be in the range 4–12, preferably 7–10.

In a presently preferred embodiment of the invention, a slurry containing 35–45 parts (solids) $TiO_2$ and 55–65 parts (solids) calcined clay was prepared and mixed at 200 rpm using a Powermatic® drill press. The pH was adjusted to be in the range of 6.0 to 11.0, preferably between 8.5 to 10.5 and ideally between 9.5 to 10.5 with sodium hydroxide and conditioned for about ten minutes at 750–800 rpm. To the resultant mixture, the required amount, typically 0.1–5 parts, by weight, of zirconium hydroxy complex chemical was added slowly. During the addition of zirconium hydroxy complex chemicals, the viscosity of the slurry increases as a result of aggregation. When the slurry viscosity increases to 2000 cps or above, a small amount of dispersant was added to improve the fluidity. The slurry property at this point may be best described as 'shear thinning' by nature. The steps involving the addition of zirconium hydroxy complex chemicals for aggregation and the subsequent addition of dispersant to improve the fluidity of the slurry were continued until the stipulated amount of zirconium hydroxy complex chemicals was added and the desired Brookfield viscosity of 500–700 cps was achieved.

The exact mechanism of aggregation of titanium dioxide with differently shaped pigment extender particles such as calcined clay, wollastonite, hydrous clay in the presence of zirconium hydroxy complex chemicals is very complex. However, owing to the fact that the zirconium hydroxy complex chemicals predominantly constitute multinuclear zirconium hydroxy species based on the structure described earlier, a complex electrostatic interaction combined with hydrogen bonding mechanism can be speculated. It is surprising that the use of zirconium hydroxy complex chemicals to produce composite aggregated pigments substantially improves the optical performance of the pigments with and without drying process.

It has been found that the addition of a small amount of the needle or rod shaped pigments, such as wollastonite or aluminum trihydrate, that are bound with $TiO_2$ and calcined clay to form a composite aggregate pigment in the presence of a zirconium hydroxy complex chemical produces a synergistic result over the individual pigments in that it leads to a great enhancement in the optical performance of the composite aggregate pigment of this invention. $TiO_2$ particles are spherical in form while calcined clay particles tend to be flat plates. Pigments composed of $TiO_2$ and calcined clay are bi-faceted in that they contain both flat plate and spherical structures. It has been found that by adding a needle or rod-shaped pigment, such as wollastonite or aluminum trihydrate, a multi-faceted pigment is obtained.

It is thought that the use of differently shaped pigment extender particles results in a composite aggregate pigment that is multi-faceted in structure, which greatly improves the optical performance of the pigment. The multi-faceted structure is thought to scatter more of the light passing through the composite pigment particles which is believed to be more open in structure. It is quite surprising that the use of these rod shaped pigments, such as wollastonite or aluminum trihydrate, produce a significant synergistic effect in enhancing the optical performance of the pigment.

Pigments prepared by the present invention have the following properties:

| PROPERTIES OF A COMPOSITE AGGREGATE PIGMENT CONTAINING WOLLASTONITE | |
|---|---|
| Constituents | |
| Wt. Ratio of $TiO_2$/calcined clay | 5/95 to 60/40 |
| Substitution of Wollastonite for calcined clay | 100:1 to 1:100 |
| Optical characteristics | |
| G. E. Brightness | 95 to 97 |
| Scattering Coefficient @ 4 g/m$^2$ | 0.41 to 0.51 @ 457 nm |
| Scattering Coefficient @ 4 g/m$^2$ | 0.32 to 0.36 @ 577 nm |
| Mylar Opacity @ 7 lb/3300 ft$^2$ | 86.1 to 90.2 |
| Particle size | |
| % Finer than 2 μm | 95% |
| Median diameter | 0.32 to 0.100.0 μm |
| Slurry properties | |
| % Solids | 59 to 61 |
| +325 mesh residue, wt % | less than 0.003%, by wt |
| Viscosity Specifications | |
| Brookfield Viscosity, cps @ 20 rpm | 400–700 @ 59–65% solids by weight |
| after one week | 600–800 @ 59–65% solids by weight |
| after two weeks | 600–800 @ 59–65% solids by weight |

The pigment slurry, thus made, exhibits sufficient shear stability to withstand production and handling conditions using conventional commercial processing equipment and also is adequately stable for use in high speed coaters used by the paper industry.

The particle size analyses reported in this invention are estimated by the Sedigraph 5100 particle size analyzer as equivalent spherical diameters (e.s.d.) on a weight percentage basis. In the example, test results were obtained essentially according to the following TAPPI (Technical Association of the Pulp and Paper Industry) test methods:
T646 om-86-for pellet preparation.
T524 om-76-L, a, b, measurements
T452 om-87-G.E. brightness.

Light scattering studies were determined on the pigments in some instances using black glass as the model substrates (Kaliski, A., TAPPI, Vol. 53, No. 11, November 1970, pages 2077–2084 titled "Performance of Some Clays in Starch Containing Paper-Coating Films; Part I. Black Glass Plates as Model Substrates"). This was done by coating a pigment slurry containing 48% solids, by weight, with 2% latex suspension onto a black glass plate at a coat weight of 2.0–6.0 g/m$^2$ (expressed as dry pigment). The reflectance values of the coatings after air drying is measured at wavelengths 457 nm and 577 nm by means of an Elrepho reflectometer. The reflectance values are converted by the use of Kubelka-Munk equations to light scattering coefficients (m$^2$/g). The light scattering coefficients give an indication of the opacifying potential of the pigment, vis-a-vis the degree of bulking of the composite pigment. The higher the values of light scattering coefficients, the rarer is the light passing through the pigment coating or the larger is the reflected and back scattered light. Apparently, the wavelengths 457 nm and 577 nm correspond to the wavelength used in the TAPPI brightness and opacity test methods, respectively.

The opacity measurements were made by coating the pigment @50% solids on a transparent polyester film, used for overhead projection, (Labelon Co., Canandaigua, N.Y.) of thickness specified as 4 mil at 4–5 different coat weights using various wire wound coating rods. The coatings were dried overnight in a controlled environment complying to TAPPI standards (50% humidity; 23° C. ambient temperature). Using a 3"×7" template, the middle portion of the coatings was isolated and several opacity measurements were made and averaged using a BNL-2 Opacimeter according to TAPPI test methods T425 om-86. The resultant opacity vs coat weight plot was interpolated to 7.0 lb/3300 ft$^2$ coat weight for comparison and reported as acetate opacity in the tables.

While the present invention has been described with reference to the preferred embodiment, it shall be understood by those skilled in the art that various changes may be made and equivalents may be substituted for elements thereof without departing from the spirit and scope of the invention as set forth in the appended claims.

CASE 1: Role of Chemical Aggregation of Zirconium Hydroxy Complex Chemicals on Optical Properties For the purpose of studying the effect of various zirconium hydroxy complex chemicals on optical properties, the composite aggregate pigments were prepared from a master batch containing 5256.0 g (4000 g dry) UDR-P $TiO_2$ pigment (Kemira Co., Savannah, Ga.) and 11007.12 g (6000 g dry) of calcined clay (Norcal®, Nord Kaolin Co., Jeffersonville, Ga.). This slurry mix is the control as will be shown in table I.

EXAMPLE 1(a)

813.14 g (500.0 g dry) of the slurry containing 40 parts $TiO_2$ and 60 parts calcined clay, by dry weight, was agitated in a Powermatic® drill press at 750 rpm for 10 minutes. The pH of the slurry was adjusted to 9.8 using 10% sodium hydroxide. To the resultant slurry, 3.0 g (12 lb/short Ton) of as received zirconium oxychloride (ZOC) liquid from Magnesium Elektron Inc., Flemington, N.J. was added slowly. As the addition of ZOC progressed, the viscosity of the slurry began to increase. Subsequently, the slurry became pasty at which point a small amount of dispersant Rohm & Haas 9400 (obtained from Rohm & Haas Co. North Olmsted, Ohio) was added to improve the fluidity of the slurry. Once again, the addition of ZOC was continued and thus the process of adding ZOC and the dispersant was repeated until the desired amount of ZOC was added to the system. After mixing the slurry for ten minutes, the Brookfield viscosity was measured and adjusted between 500 to 700 cps @20 rpm using dispersant (R & H 9400). The percent solids and pH were measured and the slurry was stored in a plastic bottle. The black glass scattering measurements were conducted on this sample.

EXAMPLE 1(b)

813.14 g (500.0 g dry) of the slurry containing 40 parts $TiO_2$ and 60 parts calcined clay, by dry weight, was agitated in a Powermatic® drill press at 750 rpm for 10 minutes. The pH of the slurry was adjusted to 9.8 using 10% sodium hydroxide. To the resultant slurry, 4.5 g (18 lb/short Ton) of as received zirconium hydroxychloride (ZHC) liquid from Magnisium Elektron Inc., Flemington, N.J. was added slowly. As the addition of ZHC progressed, the viscosity of the slurry began to increase which subsequently turned the slurry into a pasty mass. At this point, a small amount of dispersant Rohm & Haas 9400 was added to increase the fluidity of the slurry. Once again, the addition of ZHC was continued and thus the process of adding ZHC and the dispersant was repeated until the desired amount of ZHC was added to the system. After mixing the slurry for ten minutes, the Brookfield viscosity was measured and adjusted between 500 to 700 cps @20 rpm using dispersant (R & H 9400). The percent solids and pH were measured and the slurry was stored in a plastic bottle. The black glass scattering measurements were conducted on this sample.

EXAMPLE 1(c)

813.14 g (500.0 g dry) of the slurry containing 40 parts $TiO_2$ and 60 parts calcined clay, by dry weight, was agitated in a Powermatic® drill press at 750 rpm for 10 minutes. The pH of the slurry was adjusted to 9.8 using 10% sodium hydroxide. To the resultant slurry, 2.7 g (10.8 lb/short Ton) of as received zirconium oxynitrate (ZON) liquid from Magnisium Elektron Inc., Flemington, N.J. was added slowly. As the addition of ZON progressed, the viscosity of the slurry began to increase and the slurry became pasty. At this point, a small amount of dispersant Rohm & Haas 9400 was added to increase the fluidity of the slurry. Once again, the addition of ZON was continued and thus the process of adding ZON and the dispersant was repeated until the desired amount of ZON was added to the system. After mixing the slurry for ten minutes, the Brookfield viscosity was measured and adjusted between 500 to 700 cps @20 rpm using dispersant (R & H 9400). The percent solids and pH were measured and the slurry was stored in a plastic bottle. The black glass scattering measurements were conducted on this sample.

TABLE I

EFFECT OF AGGREGATION BY ZIRCONIUM HYDROXY COMPLEX CHEMICALS ON OPTICAL PERFORMANCE

| Specification | Chemical @ dosage (lb/short Ton) | initial pH | $SC_{457}$* (@ 4 g/ $m^2$) | $SC_{577}$** (@ 4 g/ $m^2$) | Mylar Opacity (@ 7 lb/330 0 $ft^2$) | Final pH | Final Solids (%) |
|---|---|---|---|---|---|---|---|
| control | no chemical | 9.8 | 0.2954 | 0.2202 | 78.66 | 9.8 | 61.49 |
| Ex. 1a | ZOC @ 12.0 | 9.8 | 0.3984 | 0.3164 | — | 6.6 | 61.35 |

TABLE I-continued

EFFECT OF AGGREGATION BY ZIRCONIUM HYDROXY COMPLEX CHEMICALS ON OPTICAL PERFORMANCE

| Specification | Chemical @ dosage (lb/short Ton) | initial pH | $SC_{457}$* (@ 4 g/ $m^2$) | $SC_{577}$** (@ 4 g/ $m^2$) | Mylar Opacity (@ 7 lb/330 0 $ft^2$) | Final pH | Final Solids (%) |
|---|---|---|---|---|---|---|---|
| Ex. 1b | ZHC @ 18.0 | 9.8 | 0.3640 | 0.2807 | 86.11 | 7.2 | 61.14 |
| Ex. 1c | ZON @ 20.8 | 9.8 | 0.3920 | 0.3083 | 86.98 | 6.7 | 61.46 |

*$SC_{457}$: Scattering Coefficient at 457 nm; **$SC_{577}$: Scattering Coefficient at 577 nm
ZOC: zirconium oxychloride; ZHC: zirconium hydroxychloride; ZON: zirconium oxynitrate Shown in Table 1 are the scattering coefficients and mylar opacities of the pigment layer coated on a black glass and acetate sheet in the presence and absence of zirconium hydroxy complex chemicals. The most striking results from Table 1 are that the aggregation process of using various zirconium hydroxy complex chemicals yields superior light scattering and hiding properties compared to nonaggregated control. Further, all the composite aggregate pigments can be prepared with high solids slurry with acceptable handling characteristics. The order of effective chemical aggregation may be given as ZOC≈ZON>ZHC.

CASE 2: ROLE OF WOLLASTONITE ON OPTICAL PROPERTIES OF THE COMPOSITE AGGREGATE PIGMENTS

In the following examples, the pigments of this invention were prepared from the same master batch as Example 1.

EXAMPLE 2(a)

813.14 g (500.0 g dry) of the slurry containing 40 parts $TiO_2$ and 60 parts calcined clay, by dry weight, was agitated in a Powermatic® drill press at 750 rpm for 10 minutes. The pH of the slurry was adjusted to 10.3 using 10% sodium hydroxide and to the resultant slurry, 20 g of wollastonite (Intercorp Inc. Milwaukee, Wis.) was slowly added in the solid form. The reduction in the titanium dioxide content was counter balanced by adding 18.4 wet grams of UDR-P $TiO_2$ slurry (14 dry grams). The pH was once again adjusted to 9.8. 3.8 g (14.9 lb/short Ton) of as received zirconium oxynitrate (ZON) liquid from Magnesium Elektron Inc., Flemington, N.J. was added slowly. With the addition of ZON, the viscosity of the slurry began to increase and turned into a high viscous slurry. At this point, a small amount of dispersant Rohm & Haas 9400 was added to lower the viscosity of the slurry. After the slurry becomes fluid, more ZON was added followed by the addition of dispersant. Thus, the process of adding ZON and dispersant was repeated until the desired amount of ZON was added. After mixing the slurry for ten minutes, the Brookfield viscosity was measured and adjusted in the range of 500–700 cps @20 rpm by adding a dispersant (R & H 9400). The percent solids and pH were measured and the slurry was stored in a plastic bottle. The black glass scattering measurements were conducted on this sample.

EXAMPLE 2(b)

813.14 g (500.0 g dry) of the slurry containing 40 parts $TiO_2$ and 60 parts calcined clay, by dry weight, was agitated in a Powermatic® drill press at 750 rpm for 10 minutes. The pH of the slurry was adjusted to 10.3 using 10% sodium hydroxide and to the resultant slurry, 26 g of wollastonite was slowly added in the solid form. The reduction in the titanium dioxide content was counter balanced by adding 23.7 wet grams of UDR-P $TiO_2$ slurry (18 dry grams). The pH was once again adjusted to 9.8. 3.8 g (13.9 lb/short Ton) of as received zirconium oxynitrate was added slowly. With the addition of ZON, the viscosity of the slurry increases and turns to high viscous slurry. At this point, a small amount of dispersant Rohm & Haas 9400 was added to lower the viscosity of the slurry. After the slurry becomes fluid, more ZON was added followed by dispersant. Thus, the process of adding ZON and dispersant was repeated until the desired amount of ZON was added. After mixing the slurry for ten minutes, the Brookfield viscosity was measured and adjusted in the range of 500–700 cps @20 rpm by adding a dispersant (R & H 9400). The percent solids and pH were measured and the slurry was stored in a plastic bottle. The black glass scattering measurements were conducted on this sample.

EXAMPLE 2(c)

813.14 g (500.0 g dry) of the slurry containing 40 parts $TiO_2$ and 60 parts calcined clay, by dry weight, was agitated in a Powermatic® drill press at 750 rpm for 10 minutes. The pH of the slurry was adjusted to 10.3 using 10% sodium hydroxide and to the resultant slurry, 300 g of wollastonite (Intercorp Inc. Milwaukee, Wis.) was slowly added in the solid form. The reduction in the titanium dioxide content was counter balanced by adding 261.6 wet grams of UDR-P $TiO_2$ slurry (200 dry grams). The pH was once again adjusted to 9.8. 7.0 g (14.0 lb/short Ton) of as received zirconium oxynitrate (ZON) was added slowly. With the addition of ZON, the viscosity of the slurry increased and turned to high viscous slurry. At this point, a small amount of a dispersant Rohm & Haas 9400 was added to lower the viscosity of the slurry. After the slurry became fluid, more ZON was added followed by dispersant. Thus, the process of adding ZON and dispersant was repeated until the desired amount of ZON was added. After mixing the slurry for ten minutes, the Brookfield viscosity was measured and adjusted in the range of 500–700 cps @20 rpm by adding dispersant (R & H 9400). The percent solids and pH were measured and the slurry was stored in a plastic bottle. The black glass scattering measurements were conducted on this sample.

TABLE II

EFFECT OF WOLLASTONITE ON THE OPTICAL PERFORMANCE OF COMPOSITE AGGREGATE PIGMENTS

| Specification | composition (% dry solids) | | | ZON dosage (lb/short Ton) | initial pH | $SC_{457}$* (@4 g/m$^2$) | $SC_{577}$** (@4 g/m$^2$) | Mylar Opacity (@7 lb/ 3300 ft$^2$) | Final pH | Final Solids (%) |
|---|---|---|---|---|---|---|---|---|---|---|
| | T | CC | W | | | | | | | |
| control | 40.0 | 60.0 | — | — | 9.8 | 0.2954 | 0.2202 | | 9.8 | 61.5 |
| Ex. 1c | 40.0 | 60.0 | — | 20.8 | 9.8 | 0.3920 | 0.3083 | 86.98 | 6.7 | 61.5 |
| Ex. 2a | 40.0 | 56.3 | 3.8 | 14.0 | 9.8 | 0.4259 | 0.3548 | 89.06 | 7.5 | 62.7 |
| Ex. 2b | 40.0 | 55.2 | 4.8 | 13.9 | 9.8 | 0.4506 | 0.3672 | 90.13 | 7.7 | 62.8 |
| Ex. 2c | 40.0 | 47.4 | 12.6 | 12.9 | 9.8 | 0.4231 | 0.3439 | — | 7.8 | 65.7 |
| Ex. 2d | 40.0 | 30.0 | 30.0 | 14.1 | 9.8 | 0.4060 | 0.3244 | — | 8.1 | 70.3 |

*$SC_{457}$: Scattering Coefficient at 457 nm; **$SC_{577}$: Scattering Coefficient at 577 nm T: $TiO_2$; CC: Calcined clay; W: Wollastonite; ZON: zirconium oxynitrate in a Powermatic® drill press at 750 rpm for 10 minutes. The pH of the slurry was adjusted to 10.3 using 10% sodium hydroxide and to the resultant slurry, 80 g of wollastonite was slowly added in the solid form. The reduction in the titanium dioxide content was counter balanced by adding 70.9 wet grams of UDR-P $TiO_2$ slurry (54 dry grams). The pH was once again adjusted to 9.8. 4.1 g (12.9 lb/short Ton) of as received zirconium oxynitrate (ZON) was added slowly. With the addition of ZON, the viscosity of the slurry increased and turned to high viscous slurry. At this point, a small amount of dispersant (Rohm & Haas 9400) was added to lower the viscosity of the slurry. After the slurry becomes fluid, more ZON was added followed by dispersant. The process of adding ZON and dispersant was repeated until the desired amount of ZON was added. After mixing the slurry for ten minutes, the Brookfield viscosity was measured and adjusted in the range of 500–700 cps @20 rpm by adding a dispersant (R & H 9400). The percent solids and pH were measured and the slurry was stored in a plastic bottle. The black glass scattering measurements were conducted on this sample.

EXAMPLE 2(d)

813.14 g (500.0 g dry) of the slurry containing 40 parts $TiO_2$ and 60 parts calcined clay, by dry weight, was agitated The most interesting observation from Table II is the effect of adding needle-shaped wollastonite on the optical properties of composite aggregate pigments (CAP). As is shown in Table II, the composite pigment containing wollastonite pigments show superior optical performance (see Ex 2a, 2b) in terms of enhanced light scattering and higher opacity compared to the one without wollastonite (Ex. 1a). However, there is an optimum for wollastonite addition. Also the composite aggregate pigments containing wollastonite can be prepared at high solids up to 70% with acceptable handling characteristics.

CASE 3: ROLE OF HEAT TREATMENT ON OPTICAL PROPERTIES

The following examples of this invention comprise of composite aggregate pigments prepared from a master batch containing 1075.55 g (800 g dry) of UDR-P $TiO_2$ pigments slurry from Kemira Co and 2220.98 g (1200 g dry) of calcined clay slurry (Norcal® obtained from Nord Kaolin Co., Jeffersonville, Ga.).

EXAMPLE 3(a)

2472.2 g (1500.0 g dry) of the slurry containing 40 parts $TiO_2$ and 60 parts calcined clay, by weight, was agitated in a Powermatic® drill press at 750 rpm for 10 min. To the resultant slurry, 2.1 g (2.8 lb/short Ton) as received ZOC was added slowly. The addition of ZOC increased the viscosity of the slurry. The viscous slurry was divided in to three portions. The first portion is example 3(a).

EXAMPLE 3(b)

One of the two remaining portions (as described in Example 3(a)) is filtered and heat treated at 300° C. for 2 Hrs. in a muffle furnace. After heat treatment the sample was air cooled and pulverized and stored as dry powder.

EXAMPLE 3(c)

The third portion is filtered and heat treated at 400° C. for 18 hrs. in a muffle furnace. After heat treatment (HT) the sample was air cooled and pulverized and stored as dry powder.

TABLE III

EFFECT OF HEAT TREATMENT ON COMPOSITE AGGREGATE PIGMENTS

| # | Example | Specification | $SC_{457}$* (@ 4 g/m$^2$) | Brightness | Hunter L | a | b |
|---|---------|---------------|---------------------------|------------|----------|------|------|
| 1 | 3(a) | no HT | 0.3039 | 93.8 | 97.36 | 0.20 | 1.5 |
| 2 | 3(b) | 300° C., 2 Hrs. | 0.3488 | 94.2 | 97.63 | 0.24 | 1.6 |
| 3 | 3(c) | 400° C., 18 Hrs. | 0.3450 | 93.9 | 97.38 | 0.25 | 1.75 |

*$SC_{457}$: scattering coefficient at 457 nm.

The results shown in Table III demonstrate that the scattering power of the composite aggregate pigments can be increased by heat treatment.

In summary, this invention has demonstrated three major processes which can be used to increase the optical performance of the composite aggregate pigments. They are:
1) chemically aggregating with the aid of zirconium hydroxy complex chemicals as illustrated in Table 1;
2) adding needle shaped minerals such as wollastonite to process 1 as shown in Table II; and
3) heat treating the composite aggregate pigment as shown in Table III. These pigments can be shipped at much higher solids content of process 1 (i.e., above 60%) without having any undesirable handling problems. The composite aggregate pigments described in this invention, by virtue of their superior optical and handling characteristics, are useful in a variety of applications such as paper, paint, plastic, rubber or other applications where it is desirable to achieve superior hiding power and substitute titanium dioxide with a cost effective composite aggregate pigment.

What is claimed is:

1. A process for producing a chemically aggregated TiO$_2$-extender pigment composite useful as a pigment, said process comprising
   mixing the following compositions in a percentage by weight of solids as follows:
   a) 2 to 90 parts by weight of particulate titanium dioxide; and
   b) 10 to 98 parts by weight of an extender pigment;
   adjusting the pH of the resulting mixture to between 8.5 and 10.5;
   and adding to the mixture:
   c) 0.01 to 20 parts of a zirconium hydroxy complex chemical in water, wherein said chemical is selected from the group consisting of the following chemicals of the following formulae:

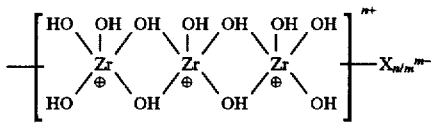

where "X" is a ligand selected from the group consisting of oxychloride, oxynitrate, hydroxychloride, acetate, nitrate, propionate, carbonate, orthosulfate, phosphate, glycolate, mandelate, sulfate, and aluminate, "n" is the number of charge on the zirconium hydroxy complex which varies from 2 to 10, and "m" is the charge of the ligand; and

where "X" is a group selected from the group consisting of carbonate, hexafluoride, glycolate, lactate, sulfate, and aluminate, and "A" is selected from the group consisting of ammonium, sodium, and potassium ions, "k" is 1 to 3, "l" is 2 to 5, "m" is 2 to 10, "n" is 1 to 4.

2. The process of claim 1, wherein the composite is prepared in a slurry by mixing composition (a) as a slurry with composition (b) as a slurry.

3. The process of claim 2 in which as the viscosity of the slurry increases to a high viscosity value after the addition of a portion of the zirconium hydroxy complex chemical, a dispersant is added in order to obtain and maintain a Brookfield viscosity of the slurry in the range of from 500 to 700 cps at 20 rpm.

4. The process of claim 2 in which the pH of the slurry is adjusted as necessary to be in the range of 6.0 to 11.0 prior to the addition of the zirconium hydroxy complex chemical (c) to the slurry.

5. The process of claim 1 in which the extender pigment (b) is a calcined clay.

6. The process of claim 1 in which from 0.1 to 90% by weight of the zirconium hydroxy complex chemical (c) is replaced by a multivalent metal ion selected from the group consisting of groups IIa, IIb, IIIa, VIa, and VIb.

7. The process of claim 1 in which from 0.1 to 90% by weight of the zirconium hydroxy complex chemical (c) is replaced by polyaluminum chloride (PAC) where PAC has a degree of neutralization or basicity as defined by the following relationship:
10% to 90%.

$$\% \text{ Basicity} = \frac{[OH]}{3 * [Al]} * 100,$$

8. The process of claim 1 in which the chemically aggregated composite is produced by replacing from 0.1 to 99.5% by weight of the extender pigment (b) with wollastonite.

9. The process of claim 1 in which the particulate titanium dioxide (a) is present in an amount from 35 to 45 parts by weight and the extender pigment (b) is present in an amount from 55 to 65 parts by weight.

10. The process of claim 9 in which the extender pigment (b) is a calcined clay.

11. The process of claim 10 in which the zirconium hydroxy complex chemical (c) is zirconium oxychloride.

12. The process of claim 10 in which the zirconium hydroxy complex chemical (c) is zirconium hydroxychloride.

13. The process of claim 10 in which the zirconium hydroxy complex chemical (c) is zirconium oxynitrate.

14. The process of claim 1 in which the TiO$_2$ extender pigment composite prepared by mixing is heat treated in dry form at a temperature of between 150 and 1100° C. for a time sufficient to increase the optical scattering power to the desired level for the pigment use intended for the composite.

15. The process of claim 14 in which the extender pigment (b) is a calcined clay.

16. The process of claim 1 in which the particulate titanium dioxide (a) has a particle size of approximately 100% by weight finer than 5 μm; with 88–99% by weight finer than 2 μm; with 85–97% by weight finer than 1 μm; with 75–90% by weight finer than 0.5 μm; with 35–75% by weight finer than 0.3 μm; 10–30% finer than 0.2 μm in equivalent spherical diameter with the average spherical diameter being between 0.18–0.35 μm.

17. A chemically aggregated composite useful as a pigment comprising:

a) 2 to 90 parts by weight of particulate titanium dioxide; and b) 10 to 98 parts by weight of an extender pigment; wherein (a) and (b) are mixed and, after raising the pH of the resulting mixture to between 8.5 and 10.5. aggregated with c) 0.01 to 20 parts of a zirconium hydroxy complex chemical in water, wherein said chemical is selected from the group consisting of the following chemicals of the following formulae:

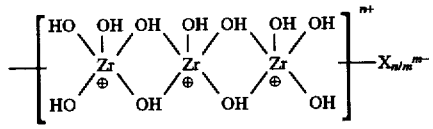

where "X" is a ligand selected from the group consisting of oxychloride, oxynitrate, hydroxychloride, acetate, nitrate, propionate, carbonate, orthosulfate, phosphate, glycolate, mandelate, sulfate, and aluminate. "n" is the number of charge on the zirconium hydroxy complex which varies from 2 to 10, and "m" is the charge of the ligand; and

where "X" is a group selected from the group consisting of carbonate, hexafluoride, glycolate, lactate, sulfate, and aluminate, and "A" is selected from the group consisting of ammonium sodium, and potassium ions. "k" is 1 to 3, "l" is 2 to 5, "m" is 2 to 10, "n" is 1 to 4.

18. The chemically aggregated composite of claim 17 which has been heat treated in dry form at a temperature of between 150° and 1100° C. for a time sufficient to increase the optical scattering power to the desired level for the pigment use intended for the composite.

19. A slurry containing a chemically aggregated composite useful as a pigment, said slurry containing a blend of solids comprising:

a) 2 to 90 parts by weight of particulate titanium dioxide; and b) 10 to 98 parts by weight of an extender pigment;

wherein (a) and (b) are mixed and, after raising the pH of the resulting mixture to between 8.5 and 10.5. aggregated with c) 0.01 to 20 parts of a zirconium hydroxy complex chemical in water, wherein said chemical is selected from the group consisting of the following chemicals of the following formulae:

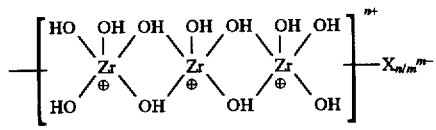

where "K" is a ligand selected from the group consisting of oxychloride, oxynitrate, hydroxychloride, acetate, nitrate, propionate, carbonate, orthosulfate, phosphate, glycolate, mandelate, sulfate, and aluminate. "n" is the number of charge on the zirconium hydroxy complex which varies from 2 to 10, and "m" is the charge of the ligand; and

where "X" is a group selected from the group consisting of carbonate, hexafluoride, glycolate, lactate, sulfate, and aluminate, and "A" is selected from the group consisting of ammonium, sodium, and potassium ions. "k" is 1 to 3, "l" is 2 to 5, "m" is 2 to 10, "n" is 1 to 4.

20. A chemically aggregated multi-faceted composite useful as a pigment comprising:

a) 2 to 90 parts by weight of particulate titanium dioxide; and b) 10 to 98 parts by weight of an extender pigment of which from 0.01 to 99.5 parts by weight is a rod shaped pigment;

wherein (a) and (b) are mixed and, after raising the pH of the resulting mixture to between 8.5 and 10.5. aggregated with c) 0.01 to 20 parts of a zirconium hydroxy complex chemical in water, wherein said chemical is selected from the group consisting of the following chemicals of the following formulae:

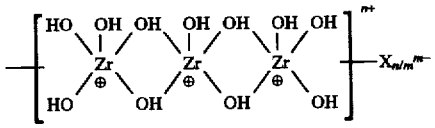

where "X" is a ligand selected from the group consisting of oxychloride, oxynitrate, hydroxychloride, acetate, nitrate, propionate, carbonate, orthosulfate, phosphate, glycolate, mandelate, sulfate, and aluminate. "n" is the number of charge on the zirconium hydroxy complex which varies from 2 to 10, and "m" is the charge of the ligand; and

where "X" is a group selected from the group consisting of carbonate, hexafluoride, glycolate, lactate, sulfate, and aluminate, and "A" is selected from the group consisting of ammonium, sodium, and potassium ions. "k" is 1 to 3, "l" is 2 to 5, "m" is 2 to 10, "n" is 1 to 4.

21. The chemically aggregated multi-faceted composite of claim 20 which the rod-shaped pigment in (b) is wollastonite.

22. The chemically aggregated multi-faceted composite of claim 20 which the rod-shaped pigment in (b) is aluminum trihydrate.

23. The chemically aggregated multi-faceted composite of claim 20 in which the composite prepared by mixing is heat treated in dry form at a temperature of between 150° and 1100° C. for a time sufficient to increase the optical scattering power to the desired level for the pigment use intended for the composite.

24. The process of claim 5 in which a portion of the calcined clay (b) is replaced by an extender pigment selected from the group consisting of:

a) from 0.1% to 99.5%, by weight of the calcined clay, of wollastonite, aluminum trihydrate (ATH) or a mixture thereof;
b) from 0.1% to 99.5%, by weight of the calcined clay, of hydrous kaolin;
c) from 0.1% to 50%, by weight of calcined clay, of silica;
d) from 0.01% to 50%, by weight of the calcined clay, of carbon;
e) from 0. 1% to 49.5%, by weight of the calcined clay, of calcium carbonate;
f) from 0.1% to 90%, by weight of calcined clay, of synthetic aluminosilicate spheres with a hollow core of 1–125 µm outer diameter and 0.01 to 100 µm core diameter, in any proportion and combination.

* * * * *